UNITED STATES PATENT OFFICE.

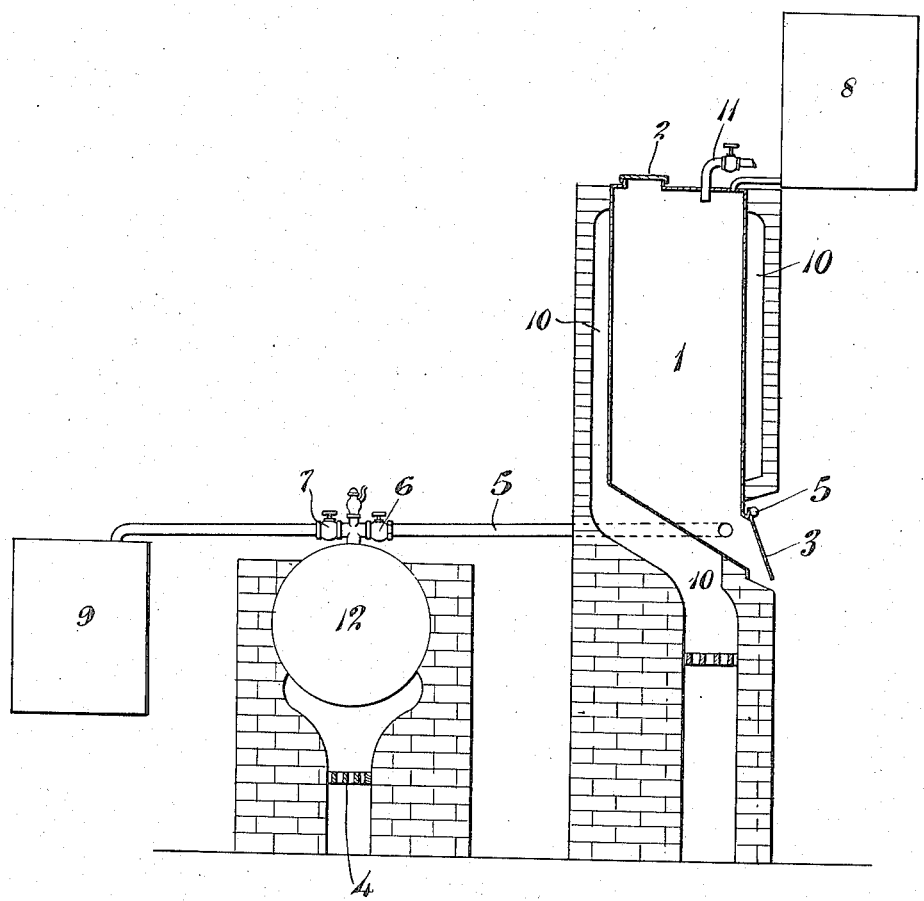

DAVID J. OGILVY, OF CINCINNATI, OHIO.

PROCESS OF EXTRACTING RESINS, OLEORESINS, OILS, AND TURPENTINES FROM RESINOUS WOODS.

1,264,551.  Specification of Letters Patent.  Patented Apr. 30, 1918.

Application filed September 10, 1912.  Serial No. 719,544.

*To all whom it may concern:*

Be it known that I, DAVID J. OGILVY, a citizen of the United States, and a resident of the city of Cincinnati, in the county of Hamilton and State of Ohio, have invented certain new and useful Improvements in the Processes of Extracting Resins, Oleoresins, Oils, and Turpentines from Resinous Woods, of which the following is a specification, reference being had to the accompanying drawings, forming a part of this specification.

The usual solvent methods employed for the extraction and separation of the resins and oleoresins from resinous woods and such like are by the application with heat of such solvents as petroleum distillates, pine oils, crude turpentine, alcohol, pine tar, rosin, and such like. I have discovered a more economical, safer from fire and explosion, and simpler method of procedure, the subject of the present invention; in which a resin solvent, water and heat are the agents, which will be more specifically pointed out and claimed.

In the drawing, the figure is a plan view in elevation of the apparatus used by me.

In operating this improved process, an apparatus is provided, having a digester or extractor 1, with ample openings for charging and discharging, each opening with its covers 2 and 3 respectively. This extractor 1 is practically filled with the resinous material to be operated on, as, for example, shreds, chips or sawdust from coniferous woods. A still 12 placed at a lower level than 1 is filled about three-fourths full of a mixture of the resin solvent and water. Heat is applied to the still 12 (by direct fire on the grate 4, if desired) and the liberated vapors of water and resin solvent are allowed to enter the extractor 1 preferably at the bottom through the pipe 5 which connects the still and the extractor. This pipe has valves 6 and 7, the valve 6 being opened and the valve 7 closed, when it is desired to have the combined vapors pass through the resinous wood. The result of the passing of these combined vapors through the resinous material is that the resins, oleoresins and turpentine oils present are washed out and carried back into the still 12 through the pipe 5, this operation being continued until the extraction is sufficient. A reflux condenser 8 is placed at a higher elevation than the extractor 1, so that the excess vapors of water, resin solvents and turpentines may be condensed and returned to the extractor 1 and the still 12. When the operation is completed, the still 12 containing the watery liquid and the resinous magma is connected with the exhaust condenser 9 and disconnected with the extractor 1, through the agency of the valves 6 and 7. The application of heat to the still 12 is continued and a preliminary separation of the resin solvents, turpentines and oils is made, the resulting distillate being further fractionated as desired. The resinous magma and watery liquor remaining in the still 12 are separated, and the magma utilized for the production of rosin products.

By inclosing the extractor 1 in brickwork as shown, the extractor may be then heated directly by furnace and flues 10, this modification being more convenient for treating the resinous woods and such like by submergence in the heated mixture of resin solvent and water. In this case, the resinous wood, preferably reduced so as to facilitate the action of the solvents, is introduced into the extractor 1, filling it about three fourths full, closing the valve 6 and the discharge cover 3. Enough of a mixture of resin solvent and water is added to just cover the resinous material under treatment. Heat is applied to the extractor 1 by the furnace and flues so long as there is evidence of sufficient resinous and oily material being extracted, the vapors from the operation being condensed and returned to the extractor 1 by the reflux condenser 8. When the extraction has been sufficient, the heating is discontinued and the watery liquor and resinous magma transferred to the still 12 by opening the valve 6. Any resinous magma remaining among the treated material may be removed by drenching with warm water. By now heating the resinous magma and the watery liquor in the still 12, opening the valve 7 and closing the valve 6 the resinous solvents and turpentine oils in vapor form pass into the exhaust condenser 9, and may have a preliminary separation, to be further fractionated as desired. The resinous magma remaining in the still 12 is separated from the watery liquor and is available for the production of rosin products.

Other designs of apparatus are available. The extractor and still may be combined in one vessel, extractors in which the resin solvents and water circulates. When the residual wood is required for pulp making an ordinary pulp digester with some alterations and additions may be utilized, thereby making the extraction of the resins and oils and the production of pulp all in one vessel.

When the resinous magma floats on the surface of the watery liquor, it may be easily removed by overflowing with water through pipe 11.

When the resinous wood operated on is rich in turpentines, it may be exposed to a preliminary steaming, and part of the turpentines will be carried over with the steam into the exhaust condenser 9. In this case, much of the resins are separated and remain mingled throughout the wood, and consequently are difficult to recover. By then adding a mixture of water and a resin solvent such as an .850 sp. gr. petroleum and heating the whole, the resins, oleoresins and turpentine oils will be assembled and at the same time more fully extracted from the wood, and may be then run off from the wood with the watery liquor, the chips being further drenched with hot water to remove more thoroughly any remaining resinous magma. When the resinous material operated on is practically free from turpentines such as resinous wood which has been exposed to the weather, or which has become impregnated with rosin such as cooperage, or batting dross and such like, the operation then becomes simplified in so far that the separation of the turpentine is not a primary object, and the resin solvents in such case may be used continuously until they become well saturated with turpentines and oils, it will then be time to fractionate and separate what turpentines and oils may be present.

The resin solvents required in my process depend on the final or ultimate use for which the resins are required; if in a hard and solid condition then it is proper to use a solvent which will evaporate easily in low pressure steam, whereas if the resin is required in a fluid or semisolid condition then a still heavier solvent should be used in the extraction as the solvent may become an integral part of the result. I prefer the refined distillates from mineral oils, coal tar and wood, which begin to boil at 120° C. (in absence of water) and distil dry about 220° C. Resin solvents which do not volatilize to any extent until the water begins to boil are preferable, as the resulting mixture of resin solvent vapor and steam is comparatively free from fire risk. Resin solvents which volatilize freely below 100° C., such as benzene, petroleum naphtha, wood and grain alcohol, are very effective in my process, provided the extra fire risk is no objection, while resin solvents which will not easily volatilize until exposed to high pressure or superheated steam are also very effective, such as petroleum oils, specific gravity .865 or .890. In using heavy resin solvents the separation of the turpentines and oils is simplified.

Among the advantages of this improvement are the following: economy in the quantity of resin solvent required, the facility of volatilizing and refluxing the resin solvents at a comparatively low temperature, reducing the tendency of the wood chips to pack. In the submergence method, the addition of salts such as calcium chlorid to the water, reduces the tendency of the wood chips to pack, and such salts are useful in increasing the temperature of the digestion and in vapor methods, resulting in quicker results.

Naphthalene is a desirable solvent in my process on account of its low price, its easy volatility, recovery and purification. Its specific gravity results in its being less buoyant in water than the lighter solvents, therefore it has a tendency to keep diffused more thoroughly among the wood chips in submergence.

The following few examples will illustrate proportions applicable in this improvement, taking an ordinary average grade of air dry pine wood in the form of chips.

For the vapor method:

| | | | | | |
|---|---|---|---|---|---|
| Wood | 30%. | Commercial xylene | 20%. | Water | 50%. |
| Wood | 40%. | Petroleum S. G. .810 | 20%. | Water | 40%. |
| Wood | 50%. | Commercial benzol | 10%. | Water | 40%. |
| Wood | 30%. | Alcohol | 15%. | Water | 55%. |

For the submergence method, the following proportions give good results:

| | | | | | | | |
|---|---|---|---|---|---|---|---|
| Wood | 30%. | Naphthalene | | 20%. | | Water | 50%. |
| Wood | 30%. | Petroleum S. G. .800 | 30%. | Water | 30%. | Calcium chlorid | 10%. |
| Wood | 15%. | Naphthalene | | 5%. | | Water | 80%. |
| Batting dross | 25%. | Paraffin oil S. G. .890 | | 25%. | | Water | 50%. |

On account of the continuous presence of water or its vapor, and the comparatively low temperature at which the operation may be conducted, there is a minimum loss of the volatile contents.

The submergence method results in the uniform heating of the material.

In operating on sawdust by the submergence method, it is advisable to have a larger percentage of water present, than when chips are operated on, so as to prevent packing. In treating sawdust I prefer a refined petroleum sp. gr. .825, resulting in a resinous magma which floats, while the sawdust becoming saturated with water, sinks.

It will be noted that the waters and solvents are in each case applied in the same physical condition. The molecules of water and solvent, or of steam and vaporized solvent accompany each other and act simultaneously throughout the process. The efficacy of action and great fire protection in the extracting of rosins and turpentines from wood, is thus accomplished by me.

The matter of economy in the present process is a very important feature, the presence of the water or steam enabling me to divide and spread a small percentage of the solvent over a large surface, whereas if a same percentage of resin solvent was used minus the water it would practically be lost by being absorbed by the resinous wood operated on. Another advantage of my process is the low temperature at which the operation may be conducted, the presence of the water enabling the resin solvent to volatilize at a lower temperature than when the resin solvent is volatilized alone; as for example, wood 15%, naphthalene 5%, water 80%. Such a mixture operates satisfactorily at the temperature of the boiling water. Now omit the water and try the extraction of the resins from the wood with naphthalene alone, which volatilizes very slowly until it arrives at its boiling point, viz.; 218 C.; whereas when water is present the naphthalene volatilizes quite freely at the temperature of the boiling water. In the case where alcohol is used as the agent, when the dilute alcohol is introduced into the still, the mixed vapors which pass into the resinous material usually have a preponderance of alcohol, thus rendering it more active as a solvent; this solution returning to the still, is revolatilized leaving the resins remaining in the still and the alcohol passing up with the steam among the resinous wood continues the action.

Taking all in all, then, among the advantages of this improvement are the following: The operation may be conducted at a comparatively low temperature. The continual presence of water or its vapor reduces the risk of fire and explosion. The water and steam assist in disintegrating the wood so that the resin solvents may have free action. The presence of the water or steam divides and spreads the resin solvent, even when a minimum percentage of resin solvent is used. It facilitates the refluxing or returning of the resin solvent to the extractor or the still, so that it may be revaporized and continue its action on the resinous wood.

The use of water in either liquid or vapor form at substantially the boiling point of water, being so closely allied, the chemical term $H_2O$ seems applicable in a broad sense to express the essence of my invention, and it is so used in the claims, when either steam and water or both is intended. Thus a reservoir filled full of wood and only part full of water and solvent, would use both the water and the steam process.

I claim:

1. The method of extracting and separating the resins, oleoresins, oils and turpentines from resinous woods and the like, which consists in submerging the resinous wood to be operated on in a mixture of water and resin solvent, and exposing the whole to heat to boil the mixture, substantially as described.

2. The method of extracting and separating the resins, oleoresins, oils and turpentines from resinous woods and the like, which consists in exposing the wood to an initial heating in water, adding resin solvents, then continuing the heating at the temperature required to boil the water in presence of the resin solvent and wood.

3. The method of extracting and separating the resins, oleoresins, oils and turpentines from resinous woods, which consists in exposing a mixture of comminuted resinous wood, a resin solvent and water at the temperature necessary for boiling in the mixture, to active circulation and agitation so as to retard the settling and cohering of the comminuted wood.

4. The method of extracting and separating the resins, oleoresins, oils and turpentines from resinous woods and the like, which comprises exposing the wood to the combined action of resin solvent and water at the temperature necessary to boil same in conjunction with a resin solvent, then exposing the resulting resinous magma to a further heating so as to separate the light oils and turpentines from the resinous magma by distillation.

5. The method of extracting and separating the resins, oleoresins, oils and turpentines from resinous woods, which comprises the subjection of a proportion of wood to the combined action of a mixture of water and a resin solvent at the temperature necessary to boil same in the mixture in proportions larger and smaller than the proportions of wood respectively.

6. The method of extracting and separating the resins, oleoresins, oils and turpentines from resinous woods, which consists in exposing the wood to the action of water at the temperature necessary to boil same in conjunction with an oily and spirituous resin solvent, resulting in the resinous and oily constituents of the wood being separated in the condition of a magma, then exposing said magma to heat in a still to remove the lighter turpentines and oils, leaving the heavier oily constituents in combination with the resins.

7. The method of extracting and separating the resins, oleoresins, oils and turpentines from resinous woods, which consists in treating the woods simultaneously with resin solvents and $H_2O$ at a temperature substantially that of the boiling point thereof.

8. The method of extracting and separating the light oils and turpentines from resinous woods and the like, which comprises the subjection of the resinous woods to the action of resin solvents in the presence of $H_2O$ at boiling temperature.

9. In the extraction of rosin and turpentine from coniferous wood, the process which comprises simultaneously treating such wood in a comminuted state with water and a volatile solvent at their joint boiling point till the rosin and oils are dissolved and extracted by such volatile solvent, the amount of such volatile solvent present being greater than that naturally present in the wood.

10. In the extraction of rosin and turpentine from coniferous wood, the process which comprises heating such wood at a temperature below 100° C. in the presence of water vapor and vapors of a volatile solvent till the rosin and oils are extracted by such volatile solvent, the amount of volatile solvent present being greater than that normally existing in the wood.

DAVID J. OGILVY.

Witnesses:
 MARTIN ALLEN,
 K. SMITH.